United States Patent [19]

Taga et al.

[11] Patent Number: 5,012,355
[45] Date of Patent: Apr. 30, 1991

[54] ROTARY HEAD TYPE MAGNETIC RECORDING/REPRODUCING APPARATUS WITH READ-AFTER-WRITE FEATURE

[75] Inventors: Yuji Taga; Masashi Katoh, both of Kakuda, Japan

[73] Assignee: Alps Electric Co., Ltd., Tokyo, Japan

[21] Appl. No.: 401,322

[22] Filed: Aug. 31, 1989

[30] Foreign Application Priority Data

Nov. 25, 1988 [JP] Japan ............................ 63-153250[U]

[51] Int. Cl.⁵ ...................... G11B 27/36; G11B 15/14; G11B 5/27
[52] U.S. Cl. ........................................ 360/31; 360/64; 360/84
[58] Field of Search ........................ 360/84, 31, 64, 85

[56] References Cited

U.S. PATENT DOCUMENTS 4,669,002 5/1987 Nishioka ............................ 360/84 X

FOREIGN PATENT DOCUMENTS 38-171404 7/1963 Japan .

Primary Examiner—A. J. Heinz
Attorney, Agent, or Firm—Guy W. Shoup; Norman R. Klivans

[57] ABSTRACT

A rotary head type magnetic recording/reproducing apparatus having two playback heads A' and B' for verifying the recorded condition after recording on a magnetic tape by two recording/reproducing heads A and B (read-after-write) by which any recording error is found immediately. Two playback heads A' and B' are mounted, respectively, at positions separated by 90° around a rotational center axis relative to the recording-/reproducing heads A and B along the head rotating direction. Heads A' and B' are mounted also deviating by a particular dimension relative to the recording/reproducing heads A and B, along a direction perpendicular to the head scanning direction. Since read-after-write is performed immediately after recording, any recording error is found almost simultaneously with recording, by performing read-after-write as in normal reading.

5 Claims, 2 Drawing Sheets

ROTARY HEAD TYPE MAGNETIC RECORDING/REPRODUCING APPARATUS WITH READ-AFTER-WRITE FEATURE

BACKGROUND OF THE INVENTION

1. Field of the Invention

The present invention relates to a rotary head type magnetic recording/reproducing apparatus having a playback head for verifying a recorded state after recording to a magnetic tape (hereinafter described as "read-after-write"), and more particularly, to a rotary head type magnetic recording/reproducing apparatus capable of finding a recording error simultaneously with recording.

2. Description of the Prior Art

FIG. 5 is a plane view showing a rotary drum and the magnetic heads of a rotary head type magnetic recording/reproducing apparatus having conventional magnetic heads for read-after-write use, and FIG. 6 shows read-after-write according to this apparatus. The apparatus in FIGS. 5 and 6 is disclosed in the publication of Japanese laid-open patent Sho-63-171404.

In this apparatus, recording/reproducing heads A and B, and playback heads A' and B' are mounted on rotary drum 1. These magnetic heads A, B, A', B' are mounted spaced apart 90° from each other on rotary drum 1. Playback head A' is for verifying the recorded state on a magnetic tape T for recording/reproducing head A, and the playback head B' is for verifying the recorded state for recording/reproducing head B.

In a recording mode, the magnetic tape T travels along the rotary drum 1 at a predetermined speed in the direction of arrow α in FIG. 6. In this state, when the rotary drum 1 is rotated in the direction of arrow β in FIG. 5, the recording/reproducing heads A and B (having azimuth angles differing from each other) scan the magnetic tape T in a direction of arrow γ of FIG. 6.

Accordingly, the recording/reproducing heads A and B perform, alternatively, recording at an azimuth angle differing from each other on the magnetic tape T to thereby form the recording tracks t1–t10. Further, scanning of each track is within the period that the rotary drum 1 rotates by 90°. When the rotary drum 1 is further rotated by 90° from the time when the scanning of recording track t1 by the recording/reproducing head A is terminated (delayed 180° from the start of scanning by the same head A), recording/reproducing head B reaches the scanning starting point of the recording track t2 neighboring to the recording track t1, and scanning by head B is performed within the period when the rotary drum 1 is rotated by 90°. That is to say, recording of 2 tracks (one frame) of the recording track t1 and t2 is performed in one rotation of the rotary drum 1.

Thus, the read-after-write of data recorded on the magnetic tape T is performed by the playback heads A' and B' as aforementioned, however, it is delayed one frame after recording. That is to say, as shown in FIG. 6, the playback head A' reaches the scanning starting point of the recording track t9 at a time when the recording/reproducing head A has completed recording of the recording track t9 and the recording/reproducing head B has completed the scanning of the recording track t10. Therefore, read-after-write is performed by delaying one frame. The read-after-write by the playback head B, is performed similarly by delaying one frame. Therefore, the positions (height in the axial direction of the rotary drum) of the playback heads A' and B' are such that read-after-write is performed by delaying one frame as aforementioned.

Further, the recording track t11 shown by the broken line in FIG. 6 shows that scanning is started by the recording/reproducing head A after the rotary drum 1 is turned by 90° from the state shown in FIG. 6, and the read-after-write of the recording track t9 by the playback head A' is completed. The width of this track t11 is equal to the head width a of the recording/reproducing head A and it is a larger dimension by as much as the overwriting width (overlapped writing) c from the recording track width b after overwriting.

However, in this conventional rotary head type magnetic recording/reproducing apparatus, since the read-after-write is performed by delaying one frame (2 tracks) after recording, a time period of scanning time of over one frame elapses before any recording error is detected after recording, therefore, there is the problem that rapid finding of the recording error is not possible.

SUMMARY OF THE INVENTION

Therefore, the present invention solves this problem, and it is an object of this invention to provide a rotary head type magnetic recording/reproducing apparatus capable of finding a recording error nearly simultaneously with writing, by performing read-after-write immediately after recording.

According to the invention, in a rotary head type magnetic recording/reproducing apparatus comprising two recording/reproducing head A and B which are mounted at positions confronting each other by 180° and each having a different azimuth angle, and two playback heads A' and B' which are mounted at positions confronting each other by 180° and playback heads A' and B' each have the same azimuth angle, respectively, as do said recording/reproducing heads A and B. Said playback heads A' and B' are mounted, respectively, at positions separated by 90° around a rotational center axis relative to the recording/reproducing heads A and B along with the head rotating direction; at the same time, heads A' and B' are mounted deviating by as much as a particular dimension added to the overwriting width according to the recording/reproducing heads A and B, which dimension is equal to a half width of the recording track relative to said recording/reproducing heads A and B, along the direction perpendicular to the head scanning direction.

According to the present invention, after the recording/reproducing heads A and B have scanned the magnetic tape and completed the recording, immediately the playback heads A' and B' scan the same recording track to thereby execute read-after-write.

Accordingly, a track portion scanned by the playback heads A' and B' is not all of the track having the same width that has just been recorded by the recording/reproducing heads A and B, but it is a portion of the track width excluding a portion to be overwritten (overlapped in writing) by the recording/reproducing head A or B. Therefore, the read-after-write can be performed as is normal reading.

BRIEF DESCRIPTION OF THE DRAWINGS

For a better understanding of the invention, and to show how it may be carried out, reference will now be made, by way of example, to the accompanying drawings, in which.

DETAILED DESCRIPTION OF THE INVENTION

Hereinafter, a preferred embodiment of the present invention is described in detail with reference to the accompanying drawings.

Figure 1:
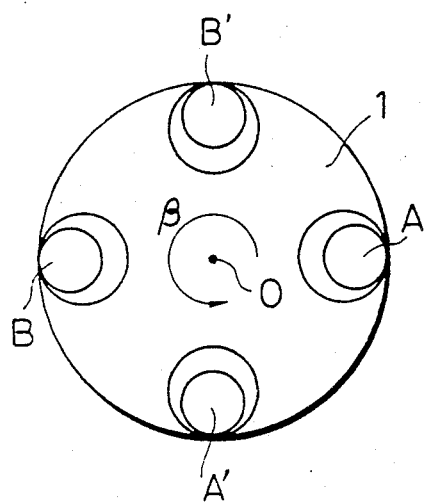
FIG. 1 is a plane view showing a rotary drum and magnetic heads of rotary head magnetic recording/reproducing apparatus according to a preferred embodiment of the present invention.
Figure 2:
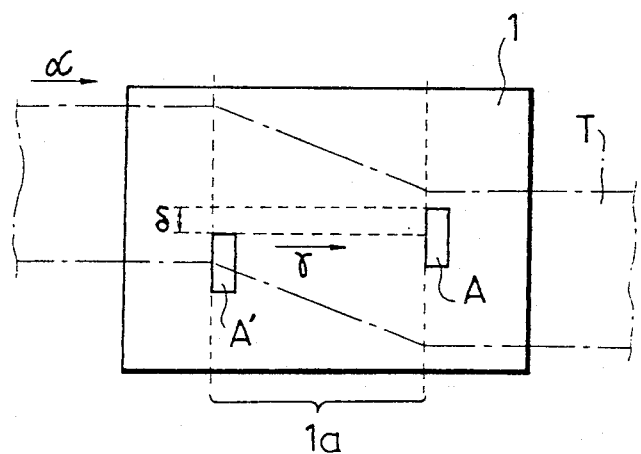
FIG. 2 is a side view of FIG. 1.
Figure 3:
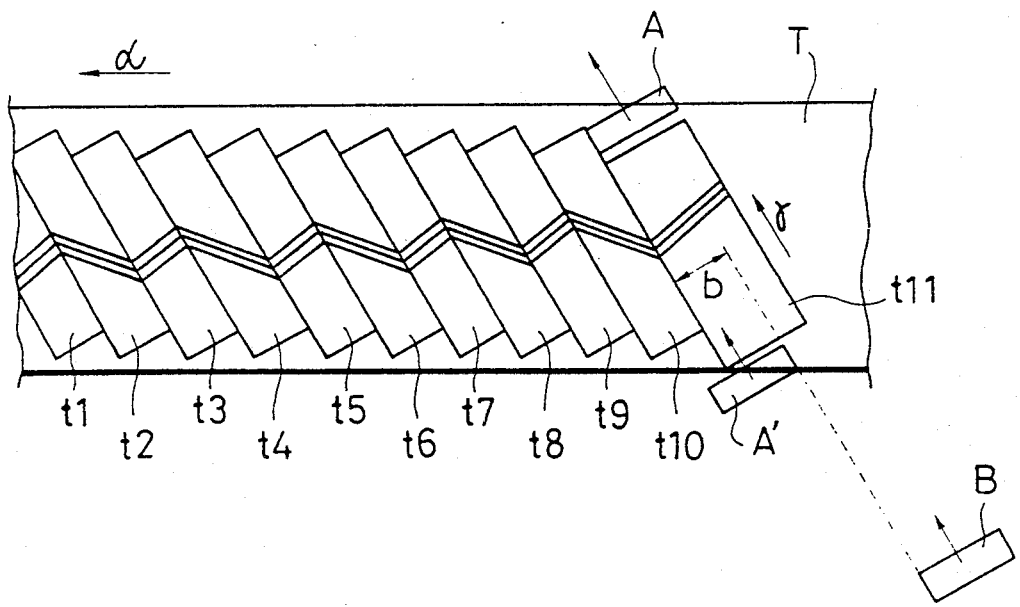
FIG. 3 is a schematic format explaining the read-after-write operation according to this embodiment.
Figure 4:
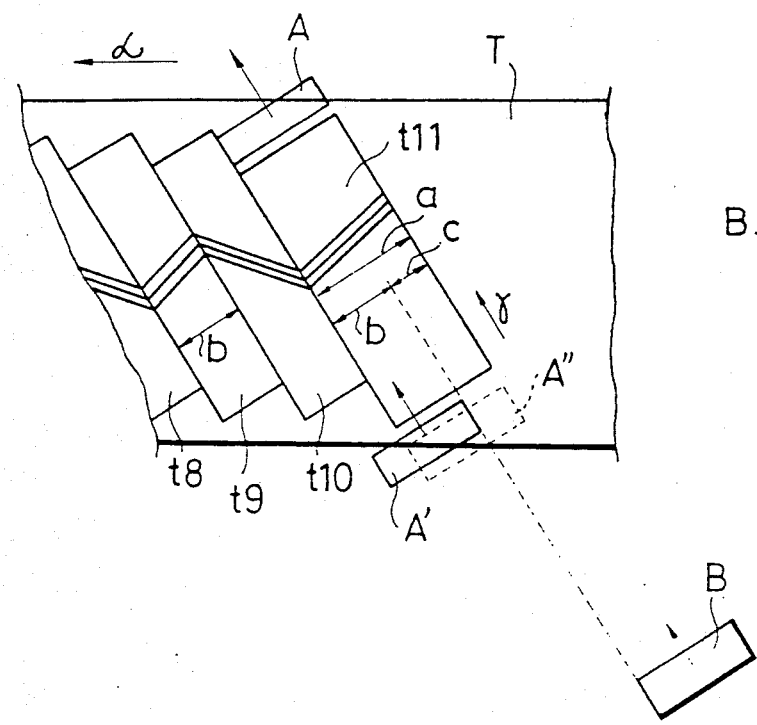
FIG. 4 is a fragmentary magnified view of FIG. 3.

FIG. 1 is a plane view illustrating a rotary drum and magnetic heads of a rotary head type magnetic recording/reproducing apparatus according to a preferred embodiment of the present invention; FIG. 2 is a side view of FIG. 1; FIG. 3 is a schematic explaining the read-after-write operation according to this preferred embodiment; and FIG. 4 is a fragmentary magnified view of FIG. 3.

Figure 5:
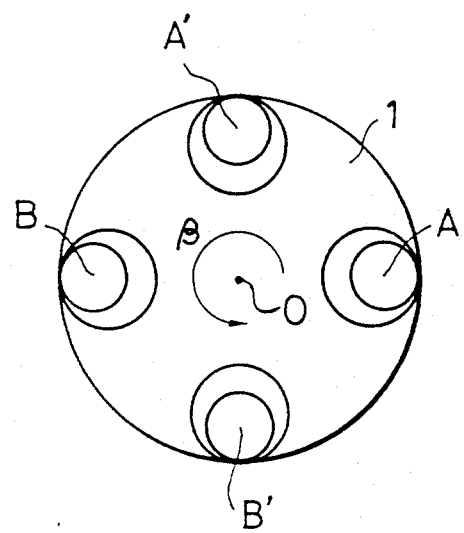
FIG. 5 is a plane view showing a rotary drum and magnetic heads of rotary head type magnetic recording/reproducing apparatus having magnetic heads for conventional read-after-write.
Figure 6:
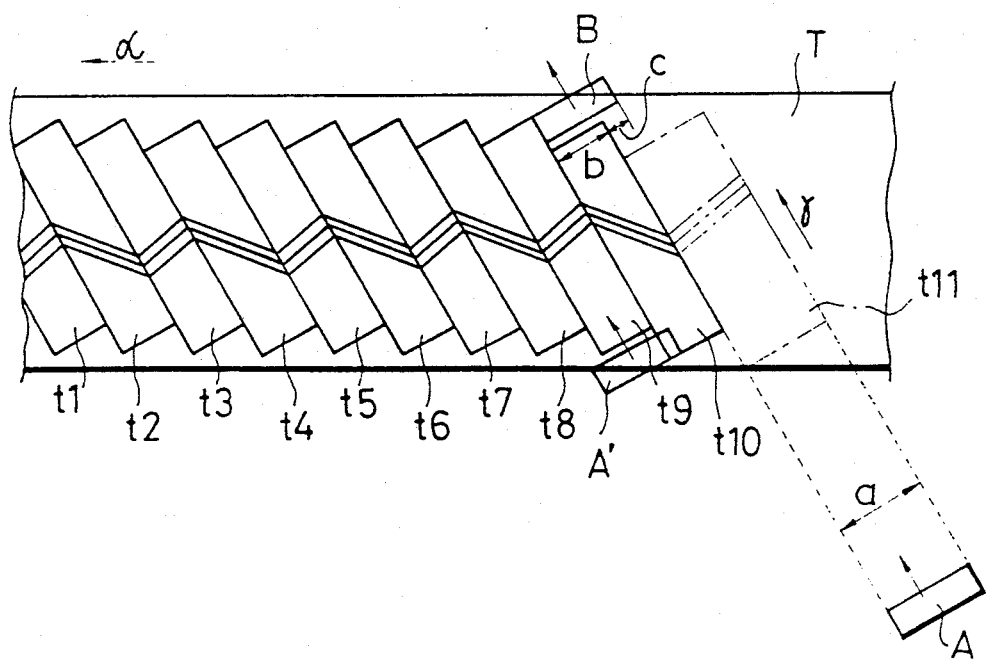
FIG. 6 is a schematic explaining the read-after-write operation by the rotary head magnetic recording/reproducing apparatus.

In these drawings, the reference symbols designate elements corresponding to those of FIGS. 5 and 6.

In the drawings, numeral 1 represents a rotary drum. Around rotary drum 1, a magnetic tape T travelling in the direction of arrow α with a predetermined speed is wound at winding angle of 90°. Symbol 1a of FIG. 2 represents the winding surface of a drum 1 in the case that magnetic tape T is wound at a winding angle of 90°. As shown in FIG. 1, the recording/reproducing heads A and B, and the playback heads A' and B' are mounted at an external circumferential surface of rotary drum 1. The recording/reproducing heads A and B are mounted at positions confronting each other by 180°, and each has a different azimuth angle from the other.

Further, the playback heads A' and B' are mounted at positions confronting each other by 180°, and each has the same azimuth angle, respectively, as do recording/reproducing heads A and B.

In this embodiment, as shown in FIG. 1, each of the magnetic heads A, B, A' and B' are mounted in the sequence A - B' - B - A' along the head rotational direction shown by arrow β, and playback heads A' and B' are mounted, respectively, at positions separated by 90° around a rotational center axis O relative to the recording/reproducing heads A and B. In this embodiment, as shown in FIG. 2, playback head A' is mounted deviating by as much as δ downward perpendicularly from the head scanning direction shown by arrow γ relative to a recording/reproducing head A having the same azimuth angle. The length of dimension δ which is added to the overwriting width c extends to a halt width of the recording track width b. Further, though it is not shown, playback head B' also is mounted downward from recording/reproducing head B by dimension δ.

Operation of this embodiment is described in detail as follows.

In this embodiment, as shown in FIG. 2, recording/reproducing heads A and B scan sequentially in the direction of arrow γ on the magnetic tape T travelling in the direction of arrow α and winding on the drum 1. Accordingly, a shown in FIG. 3, recording tracks t1 to t11 having different neighboring azimuth angles from each other are formed sequentially.

In this case, during the time rotary drum 1 performs one rotation, the recording/reproducing heads A and B scan, respectively, one track, so that recording of 2 tracks (one frame) is performed.

Further, in this embodiment, as shown in FIG. 3, a playback head A' starts the read-after-write of recording track t11 immediately after recording/reproducing head A has recorded track t11. This is because, as aforementioned, playback head A' is mounted so as to scan the magnetic tape T by delaying as much as the rotation of 90° from recording/reproducing head A (refer to FIG. 1).

Furthermore, in this embodiment, playback head A, scans only a part of the left side of track t11 having normal track width b that recording/reproducing head A has scanned, and it performs the read-after-write as in normal reading. This is because playback head A' is mounted deviating downward by as much as dimension δ from recording/reproducing head A (refer to FIG. 2).

FIG. 4 explains dimension δ. The recording of 2 tracks (one frame) is performed when the drum 1 performs one rotation, and the magnetic tape T advances one track width b during the time drum 1 rotates by 180°. Accordingly, in this embodiment, in the case that playback head A' is mounted at a position separated by 90° along the head rotating direction β from recording/reproducing head A, and playback head A' is mounted deviating downward by a dimension of half (90°/180°) of one track width b from recording/reproducing head A, playback head A' comes to the position of the broken line of symbol "A" in FIG. 4. Therefore, all of track t11 having a width of head width a recorded by recording/reproducing head A is scanned. However, since a part of track t11 having the right end width dimension c would be overwritten later by a recording/reproducing head B, when all of track t11 is scanned, it does not perform read-after-write as in normal reading. Therefore, in this embodiment, playback head A' deviates downward by a dimension δ with the overwriting width c added to a half width of track b so that only the left part having normal track width b, which would not be overwritten along the track t11, can be subject to read-after-write.

Though the above is explained with regard to the operation of read-after-write by playback head A', the operation of read-after-write by playback head B' is the same.

As aforementioned, in this embodiment, read-after-write can be performed immediately after recording by recording/reproducing heads A and B is completed, and also the same as in normal reading.

Moreover, in this embodiment, although the playback heads A' and B' are mounted on the drum 1 at positions deviated downward as much as the dimension of δ, the present invention is not restricted to this, and for example, it may be preferred to adjust the height of playback heads A' and B' while verifying whether or not read-after-write is correctly performed, when supporting the playback heads A' and B' by a piezoelectric element or an electrostrictive element.

As described above, according to the present invention, since it is possible to perform read-after-write on the recorded track immediately after completing the recording, the recording error is found immediately. Also, read-after-write is performed the same as in normal reading.

It will be appreciated that the present invention is not restricted to the particular embodiment described hereinbefore, and that variations and modifications may be made therein without departing from the spirit and scope of the invention as defined in the appended claims and equivalents thereof.

What is claimed is:

1. A rotary head device for recording on a tape comprising:
    a rotary drum which rotates in at least one direction;
    a first recording/reproducing head mounted on a surface of the rotary drum;
    a second recording/reproducing head mounted on the surface of the rotary drum at a position opposing the first recording/reproducing head;
    a first playback head for playing back data recorded on the tape by the first recording/reproducing head and mounted on the surface of the drum at a position between the first recording/reproducing head and the second recording/reproducing head; and
    a second playback head for playing back data recorded on the tape by the second recording/reproducing head and mounted on the surface of the drum at a position opposing the first playback head;
    wherein when the rotary drum rotates in a direction for recording on the tape, on each rotation of the drum, the first playback head scans the tape prior to the second recording/reproducing head scanning the tape.

2. The device of claim 1, wherein the first recording/reproducing head is separated from the second recording/reproducing head by 180°, the first playback head is separated from the first recording/reproducing head by 90°, and the second playback head is separated from the second recording/reproducing head by 90°.

3. The device of claim 1, wherein the first and second recording/reproducing heads are mounted on the drum at differing azimuth angles, the first playback head is mounted on the drum at the same azimuth angle as is the first recording/reproducing head, and the second playback head is mounted on the drum at the same azimuth angle as is the second recording/reproducing head.

4. The device of claim 1, wherein the first playback head is mounted lower on the rotary drum by a predetermined distance than is the first recording/reproducing head, and the first playback head thereby scans the tape in a path offset by a predetermined length from a path scanned by the first recording/reproducing head.

5. A method for recording on a tape comprising the steps of:
    rotating a rotary drum in at least one direction;
    providing a first recording/reproducing head mounted on a surface of the rotary drum;
    providing a second recording/producing head mounted on the surface of the rotary drum at a position opposing the first recording/reproducing head;
    providing a first playback head for playing back data recorded on the tape by the first recording/reproducing head and mounted on the surface of the drum at a position between the first recording/reproducing head and the second recording/reproducing head; and
    providing a second playback head for playing back data recorded on the tape by the second recording/reproducing head and mounted on the surface of the drum at a position opposing the first playback head; and
    rotating the rotary drum in a direction for recording on the tape and, on each rotation of the drum, scanning the tape with the first playback head prior to scanning the tape with the second recording/reproducing head.

* * * * *